（12） United States Patent
Olmstead

(10) Patent No.: US 8,919,653 B2
(45) Date of Patent: Dec. 30, 2014

(54) EXCEPTION HANDLING IN AUTOMATED DATA READING SYSTEMS

(71) Applicant: Datalogic ADC, Inc., Eugene, OR (US)

(72) Inventor: Bryan L. Olmstead, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 13/942,969

(22) Filed: Jul. 16, 2013

(65) Prior Publication Data

US 2014/0021258 A1  Jan. 23, 2014

Related U.S. Application Data

(60) Provisional application No. 61/673,517, filed on Jul. 19, 2012.

(51) Int. Cl.
*G06K 7/10* (2006.01)
*G06K 15/12* (2006.01)

(52) U.S. Cl.
CPC .................................. *G06K 7/10544* (2013.01)
USPC ............. 235/462.41; 235/462.11; 235/462.24

(58) Field of Classification Search
CPC ... G03F 9/7069; G03F 9/7076; G03F 9/7088; G06Q 10/087; G06Q 30/02; G06K 7/10544; G06K 7/10722; G07G 1/12; A61B 5/411; A61B 5/442; A61B 5/444
USPC ................... 235/462.41, 375, 462.11, 462.24
See application file for complete search history.

(56) References Cited

U.S. PATENT DOCUMENTS

| 5,494,136 A | 2/1996 | Humble |
| 6,711,293 B1 | 3/2004 | Lowe |
| 6,827,266 B2 | 12/2004 | Mergenthaler et al. |
| 7,059,527 B2 | 6/2006 | Mergenthaler et al. |
| 7,066,388 B2 | 6/2006 | He |
| 7,578,442 B2 | 8/2009 | Knowles et al. |
| 7,905,412 B2 | 3/2011 | Maeda et al. |
| 7,909,248 B1 | 3/2011 | Goncalves |
| 8,072,651 B2 | 12/2011 | Bozzi et al. |
| 8,196,822 B2 | 6/2012 | Goncalves |
| 2009/0039164 A1 | 2/2009 | Herwig et al. |

(Continued)

FOREIGN PATENT DOCUMENTS

| KR | 10-2009-0121191 | 11/2009 |
| KR | 10-2010-0126417 | 12/2010 |
| KR | 10-2011-0070991 | 6/2011 |

OTHER PUBLICATIONS

International Searching Authority, International Search Report and Written Opinion for PCT/US2013/051042, Sep. 27, 2013.

*Primary Examiner* — Edwyn Labaze
(74) *Attorney, Agent, or Firm* — Stoel Rives LLP; Robert R. Teel

(57) ABSTRACT

Disclosed are systems and methods for unassisted (i.e., customer controlled) exception handling in an automated data reader having a read zone. A first imager obtains a first image of an exception item in response to an exception generated in a read zone. An exception handling station receives the exception item, and a second imager located at the exception handling station obtains a second image of the exception item. An image processor receives the images, identifies visual object recognition features from each image, and compares the features to determine whether the first and second images represent the same exception item. If so, the exception is cleared, and the item is added to a transaction list.

22 Claims, 6 Drawing Sheets

(56) References Cited

U.S. PATENT DOCUMENTS

| | | |
|---|---|---|
| 2009/0212113 A1 | 8/2009 | Chiu et al. |
| 2010/0059589 A1 | 3/2010 | Goncalves et al. |
| 2011/0286628 A1 | 11/2011 | Goncalves et al. |
| 2013/0223673 A1* | 8/2013 | Davis et al. ............... 382/100 |

* cited by examiner

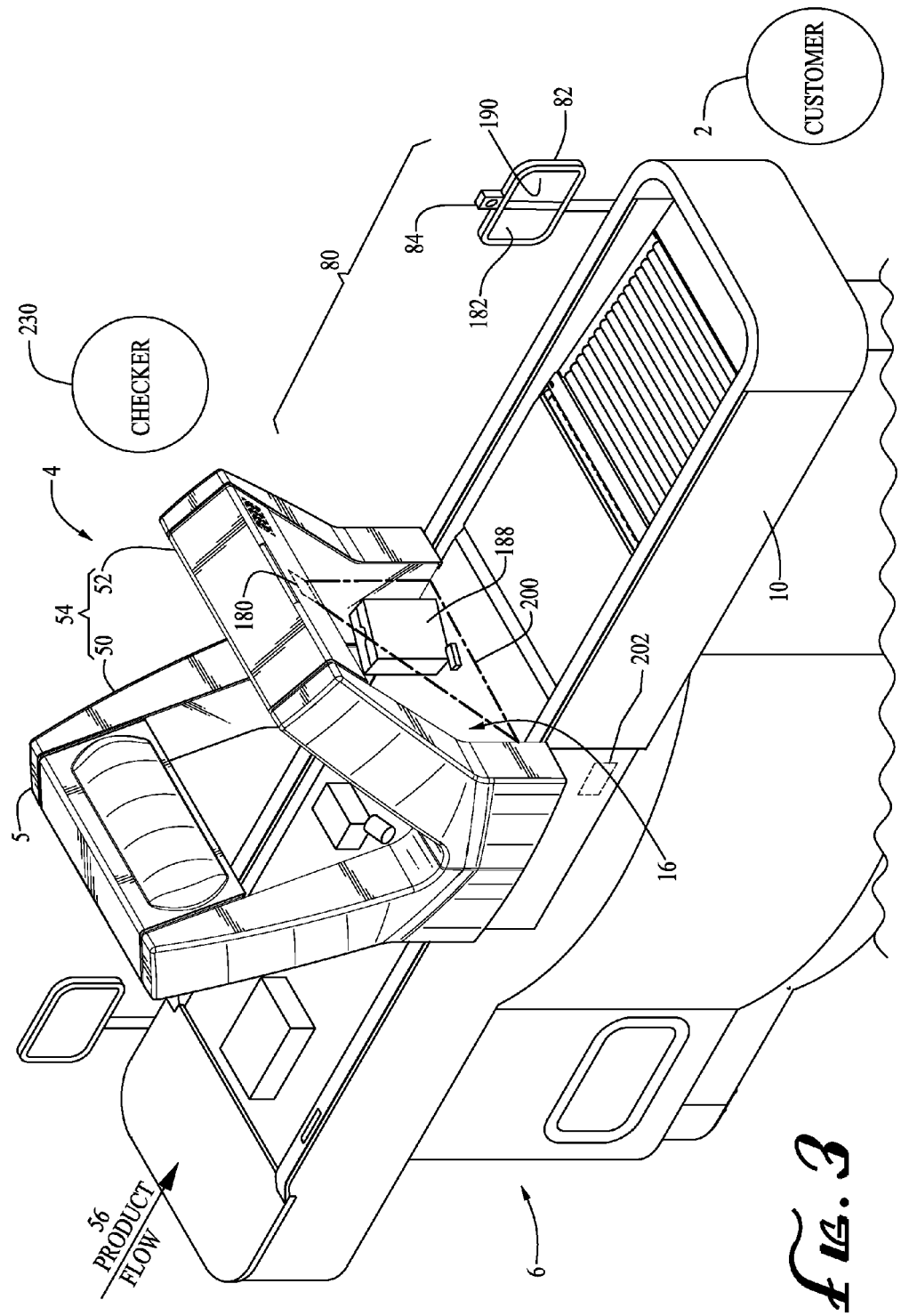

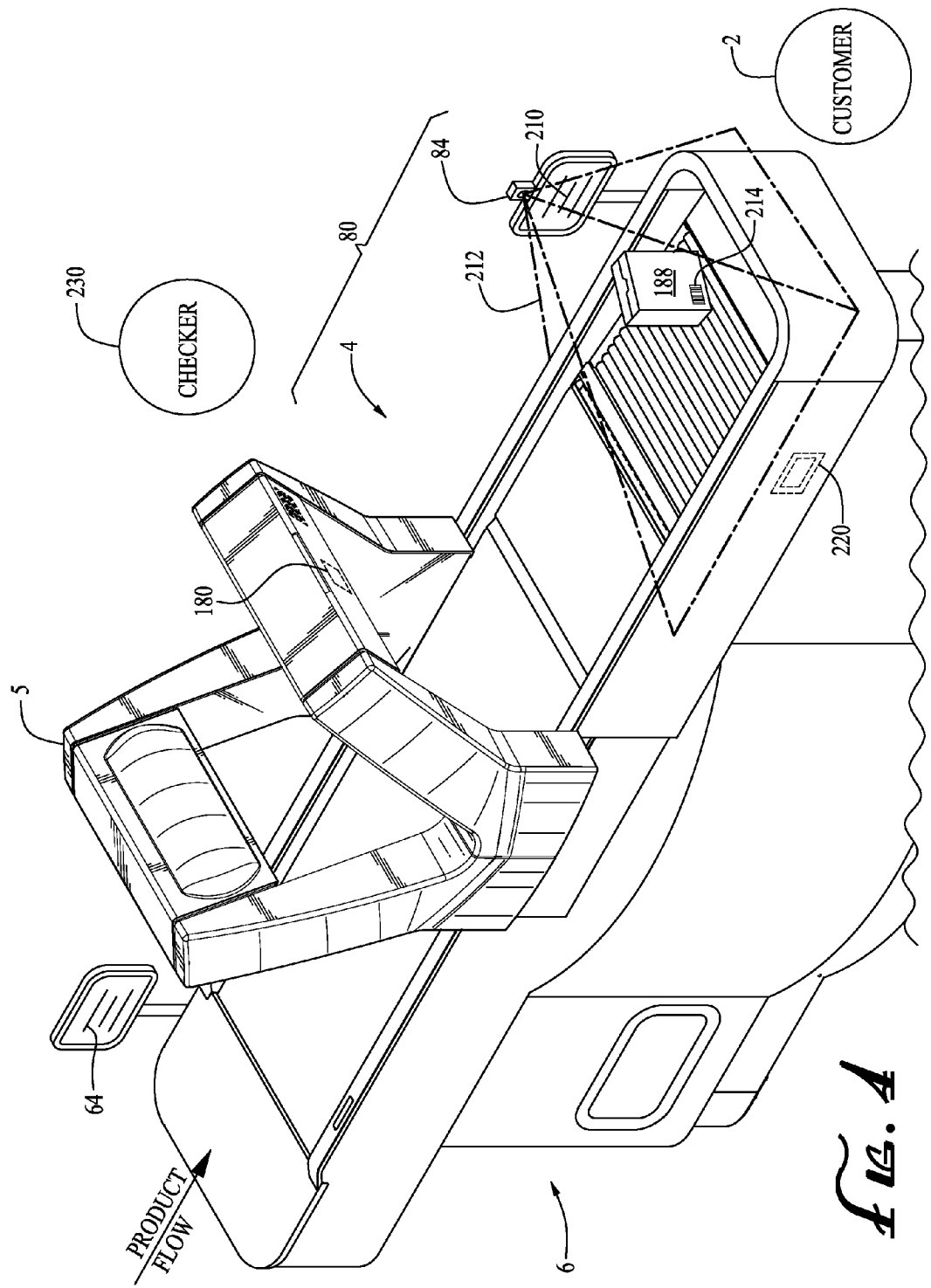

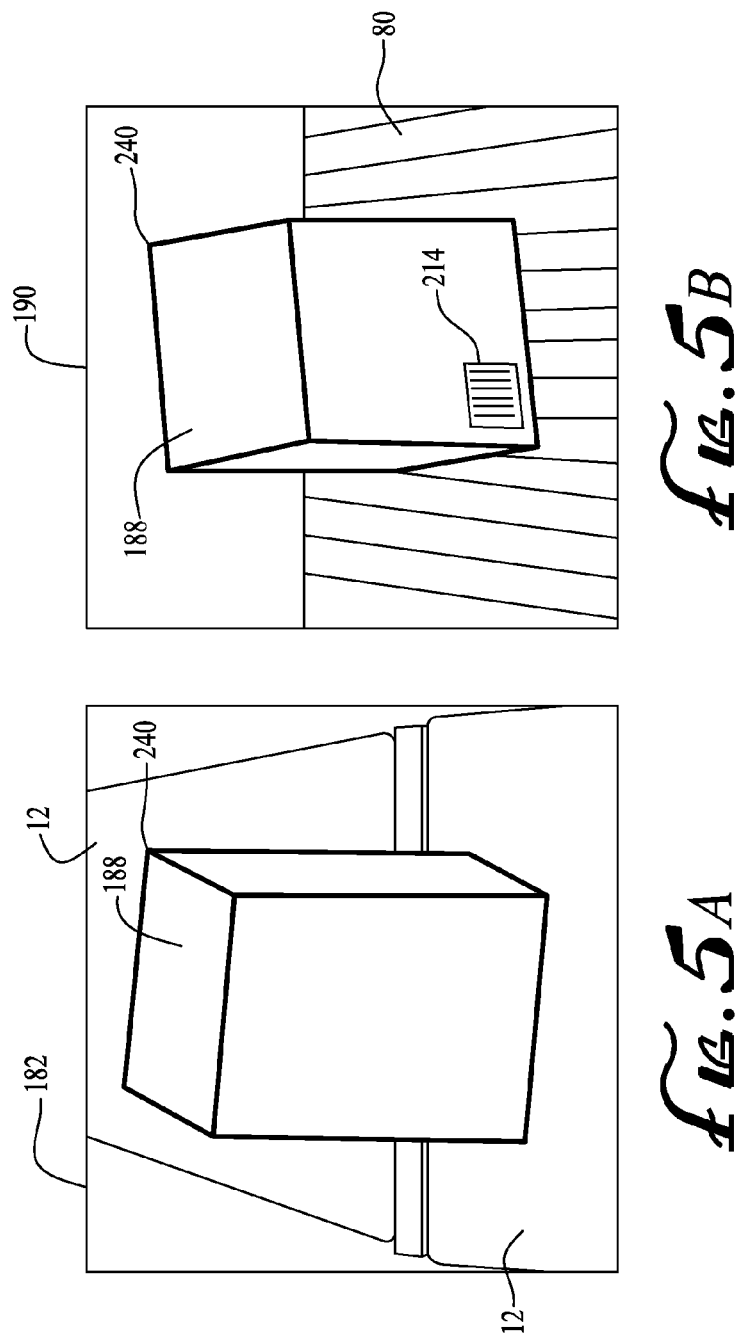

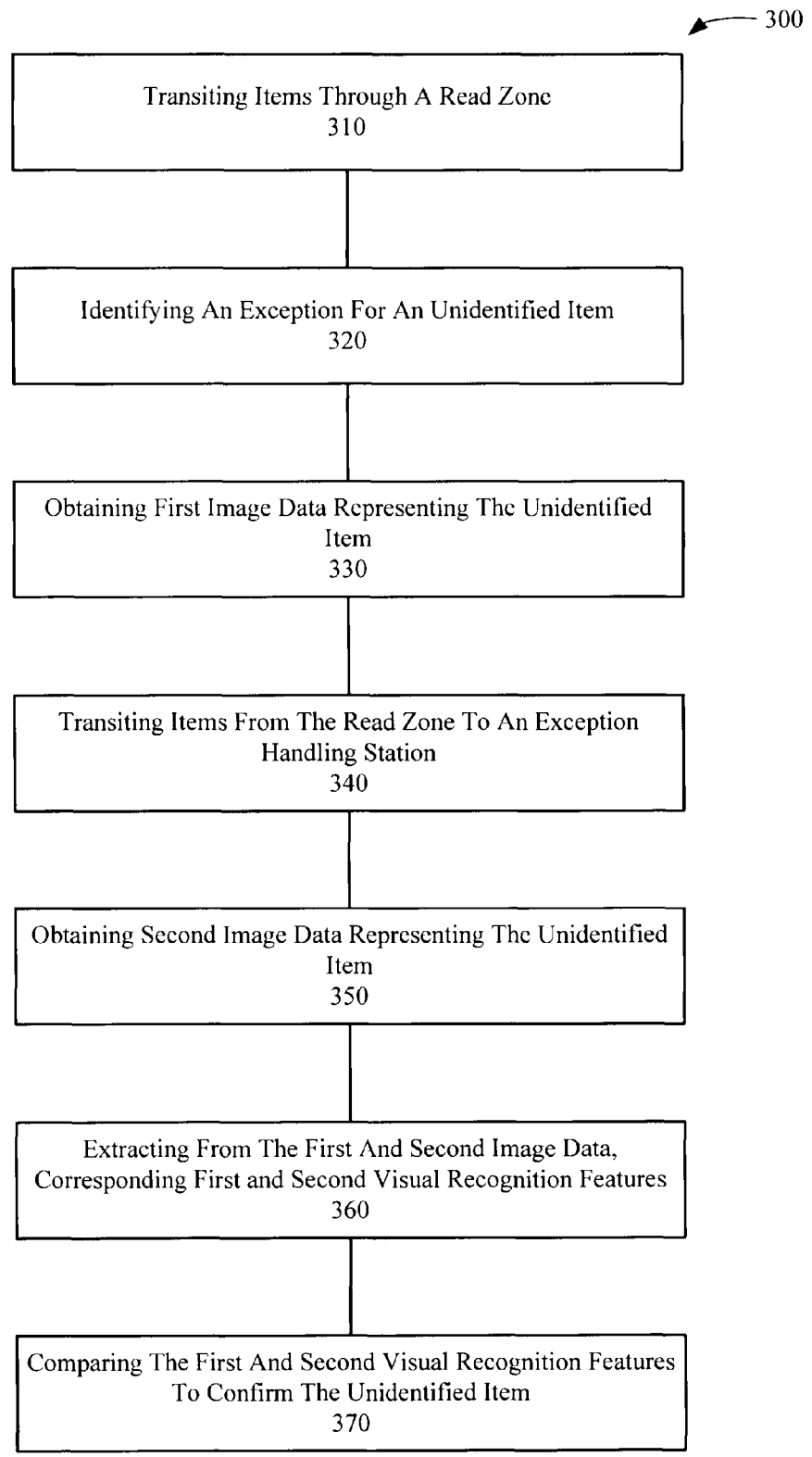

EXCEPTION HANDLING IN AUTOMATED DATA READING SYSTEMS

RELATED APPLICATION

This application claims the benefit under 35 U.S.C. §119 (e) of U.S. Provisional Patent Application No. 61/735,517, filed Jul. 19, 2012, which is hereby incorporated by reference in its entirety.

BACKGROUND INFORMATION

The field of this disclosure relates generally to systems and methods for automated data reading and, more particularly, to exception handling systems and to methods of exception handling for automated checkout systems.

Optical code readers acquire data from 1-D and 2-D optical codes or from other types of identifying indicia or symbols, such as biometric features. Two types of optical code readers used to acquire data associated with an optical code are laser scanners and imager-based optical code readers—the latter are also referred to as imaging readers. Both laser scanners and imaging readers may be referred to more generally as scanners, data readers, or simply, readers. Therefore, for purposes of this disclosure, the terms scan and read are used interchangeably to connote acquiring information associated with optical codes. Likewise, the terms scanner and reader are used interchangeably to connote devices that acquire data associated with optical codes, other symbols, or electromagnetic fields (e.g., radio-frequency identification or near field communication).

Optical codes are typically placed on items and read by data readers to help track item movement in industrial or shipping facilities, or to facilitate sales and monitor inventory at retail establishments. The optical codes are placed on or associated with items, packages, containers, or other objects and read by the data reader when the items bearing the optical codes are within a read zone during a data-reading operation. For example, in retail stores, data readers are placed at checkstands or are built into a checkstand counter and generally have one or more read volumes (scan volumes) that collectively establish a read zone in which optical codes may be successfully read.

Data readers that read the information encoded in optical codes may be generally classified into one of three types: manual readers, semi-automatic, and automated readers. With manual or semi-automatic readers (e.g., a hand-held type reader, or a fixed-position reader), a human operator positions an item relative to the read zone to read the optical code associated with the item. In an automated reader (e.g., a portal or tunnel scanner), a conveyor automatically positions the item relative to the read zone, and transports the item through the read zone so that the data reader can automatically read the optical code borne by the item.

Any of these three types of readers can be used in either assisted or self-checkout processes. In an assisted checkout process, a customer places items on a counter, deck, or conveyor of a checkstand; the items are transported to a checkout clerk (checker); and the checker then takes an item and moves it into or through the read zone of the data reader. Accordingly, the checker typically locates an optical code on a label of the item, and then holds the label in a particular orientation to obtain a successful read of the optical code as it is moved through the read zone. In a self-checkout process, a customer (or other operator) operates the data reader, unassisted by a checker or other dedicated attendant. In other words, the customer acts as the checker and oversees the data-reading operations during the self-checkout process.

SUMMARY OF THE DISCLOSURE

Systems and methods are disclosed that provide for unassisted exception handling at an exception handling station of an automated data reader. According to one embodiment, a conveying system transports items bearing identification indicia through a read zone of an automated data reader. The data reader reads the identification indicia for a successfully identified item, and produces an exception associated with an unidentified item (i.e., an item that is not successfully identified). An unidentified item that has passed through the read zone of an automated data reader and has an exception associated with it is also known as an exception item. A first imager is located proximal an outlet of the read zone and, in response to the exception, obtains first image data representing the exception item. An exception handling station receives the item that has the exception, and a second imager at the station obtains second image data representing this item. An image processor receives the first and second image data and extracts corresponding first and second visual recognition features, and compares the first and second visual recognition features to confirm whether the unidentified item is represented in both the first and second image data. The second image data optionally includes identification indicia used to identify the exception item and to clear the exception. An optional display located in the exception handling station, for example, alerts a user of the exception, provides instruction for clearing the exception, or displays the image data, which may include video data.

In some embodiments, the identification indicia includes an optical code or visual recognition features such as scale-invariant feature transform (SIFT) features. Additionally, the visual recognition features may also be SIFT features, or other object recognition features suitable for various object recognition techniques.

Additional aspects and advantages will be apparent from the following detailed description of preferred embodiments, which proceeds with reference to the accompanying drawings.

BRIEF DESCRIPTION OF THE DRAWINGS

Embodiments are described below with reference to accompanying drawings; however, the accompanying drawings depict only certain embodiments and are therefore not intended to limit the teachings of this disclosure.

FIGS. 3 and 4 are isometric views of the automated checkout system of FIG. 1 as viewed from a customer's point of egress, illustrating, respectively, a first imager operative for obtaining a first image of an item having an associated exception and a second imager operative for obtaining a second image for clearing the associated exception at an exception handing station.

FIGS. 5A and 5B are renderings of, respectively, the first image acquired by a first imager and the second image acquired by the second imager at the exception handling station of FIGS. 3 and 4.

FIG. 6 is a flowchart showing a method of automated data reading, according to one embodiment.

DETAILED DESCRIPTION OF EMBODIMENTS

In both assisted or self-checkout processes, the present inventor has recognized that problems can arise due to a misread or a non-read of an optical code (also referred to as an exception), slowing the checkout process. For example, exceptions can result from any of the following: a damaged optical code, an optical code that is obscured or occluded from view of the data reader, misalignment of the optical code (e.g., misaligned barcode lines), inadvertent movement of the optical code away from the read zone, identifying information for an imaged optical code that is unavailable in an inventory database, a mismatch between an optical code and other detected visual characteristics of the item (e.g., size, shape, or brand labeling), or other problems causing exceptions. The likelihood or frequency of an exception is exacerbated in self-checkout systems using manual or semi-automatic readers because operators (i.e., a customer) may not be familiar with the self-checkout processes or readers, or they may have difficulty in locating and positioning optical codes in a read zone for producing successful data reads. Likewise, prior automated scanners would generate exceptions because these systems occasionally failed to achieve successful scans on the first pass of an item through a scan zone due to the wide variations in product sizes, irregularities of packaging shapes, differing locations of barcodes, and due to larger items overshadowing, crowding, or concealing neighboring items.

Once exceptions are identified, the exceptions are typically resolved in a process referred to as assisted exception clearing. Assisted exception clearing generally entails an attendant rescanning the item—often with handheld scanners—in order to obtain data associated with the barcodes on packages that cause exceptions. Although assisted exception clearing slows down the checkout process when checkers or other attendants may not be available to rescan items, checkers are used because customers may not have a handheld scanner, do not know how to operate a handheld scanner, attempt to clear exceptions from packages that did not generate the exception, or they may have various other difficulties clearing the exception.

Figure 1:
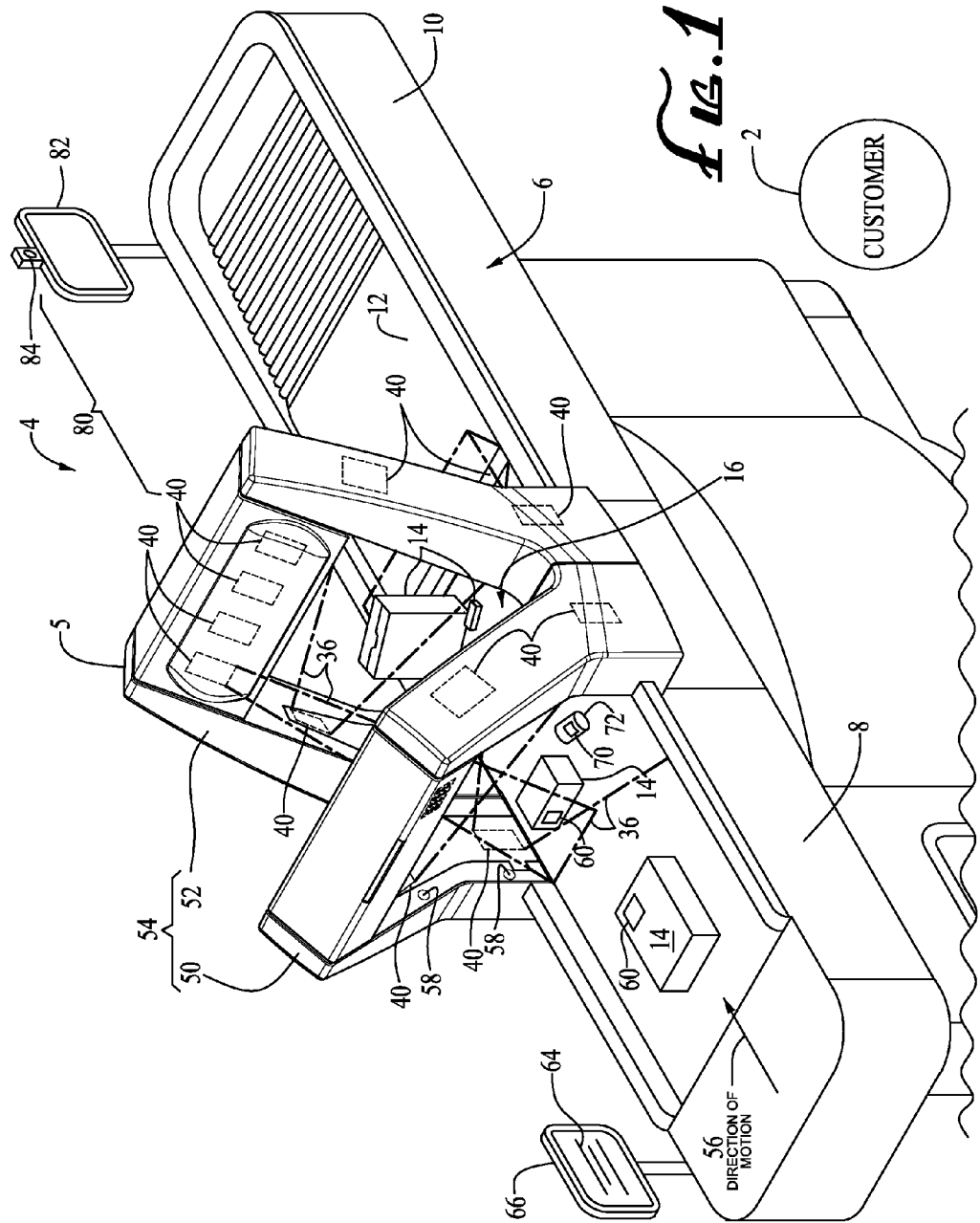
FIG. 1 is an isometric view of an automated data reader embodied as an automated checkout system including a conveying system with some items loaded on an input conveyor and other items entering a read zone, as viewed from a customer's point of ingress.

Shown from a point of ingress of a customer 2, FIG. 1 is an isometric view of an automated data reading system 4 (or simply, system 4). The system 4 includes an automated data reader 5 (or simply, reader 5) installed on an automated checkout system 6 including an inlet end 8, an outlet end 10, and a conveying system 12 for conveying items 14 (e.g., merchandise) through a three-dimensional volume (referred to as a read zone 16) of the reader 5. The read zone 16 is defined by fields of view 36 generated by imagers 40 (or other suitable data capture devices) of the reader 5. The reader 5 has an inlet housing section 50 and an outlet housing section 52 that encompass the imagers 40 and form corresponding arches 54 over the conveying system 12. Details of the reader 5 and the corresponding arches 54 are further described in U.S. Patent Application No. 61/435,777, titled, "Tunnel Scanner for Automated Checkout;" and in U.S. patent application Ser. No. 13/357,356, titled, "Tunnel or Portal Scanner and Method of Scanning for Automated Checkout," each of which is hereby fully incorporated by reference. Although the reader 5 is illustrated with inlet and outlet housing sections 50, 52 including an open space between each other, in other embodiments a portal reader may be embodied in an elongate tunnel formed over the conveying system 12, or a single housing section or arch.

The reader 5, which may include an optical code reader, is operable to obtain image, dimensional, and positional data representing the items 14 transported by the conveying system 12 through the read zone 16. To automatically move the items 14 along a transport path 56 through the read zone 16, the conveying system 12 may include one or more suitable types of mechanical transport systems. To track the items 14, the system 4 includes, for example, conveyor-speed encoders to allow for the calculation of dead-reckoning positional information, and optical detectors 58 on the arches 54 to provide dimensional information of the items 14. Thus, the system 4 is configured to automatically position and track the items 14 within and through the read zone 16.

Once the items 14 are positioned in the read zone 16, the reader 5 reads optical codes 60 or other identifying indicia (e.g., visually recognizable features) borne by the items 14. The reader 5 and associated subsystems described below with reference to FIG. 2, determine whether identifying indicia are present in the images, decode that information, and identify the tracked items based on the information. Each of the successfully identified items is optionally added to an item transaction list 64, which is presented on an inlet display 66, for example.

In a successful identification operation, the reader 5 reads an optical code and confidently associates it to one item. For example, the reader 5 reads an optical code 70 and associates it with a canister 72. The dimensions and position of the canister 72 are detected so that the canister 72 may be tracked while being transported through the read zone 16, thereby producing a single identification and corresponding entry on the transaction list 64. Accordingly, in a successful read, the canister 72 does not have other optical codes associated with it, or any other problems that would otherwise cause an exception. For example, one type of exception, called a no-code exception, is an event characterized by the system 4 tracking an item while it is transported through the read zone 16, but no optical code is read by the data reader 5. Another type of exception, called a no-item or phantom-read exception, is characterized by an event in which an optical code is read, but the system 4 does not detect that an item has passed through the read zone 16. Other types of exceptions applicable to systems and methods of this disclosure are described in U.S. patent application Ser. No. 13/357,459, titled, "Exception Detection and Handling in Automated Optical Code Reading Systems," which is hereby fully incorporated by reference.

In the event of an exception, the system 4 includes an exception handling station 80 that includes an outlet display 82 and an imaging reader 84 (e.g., a camera, or other imager) affixed to the top of the display 82 or other suitable location. The exception handling station 80 is located proximal the outlet housing section 52, downstream along the path 56 of the conveying system 12 at the outlet end 10 configured to receive items from the data reader 5 (e.g., a bagging area). Thus, a user (e.g., the customer 2) can readily observe and subsequently clear the exception without assistance of a clerk. In other words, the exception handling station 80 provides for unassisted exception handling. An overview of an exception handling system 80 is described below, including an example scenario of unassisted exception handling using the exception station 80 described with respect to FIGS. 3-4, 5A, and 5B. Methods of using the exception handling station are also described, in particular with respect to FIG. 6.

In some embodiments, exception handling stations (also referred to as processing stations or systems) may have smaller areas than that of station 80. Additionally, in other embodiments, processing stations may be located remotely away from the reader 5.

Figure 2:
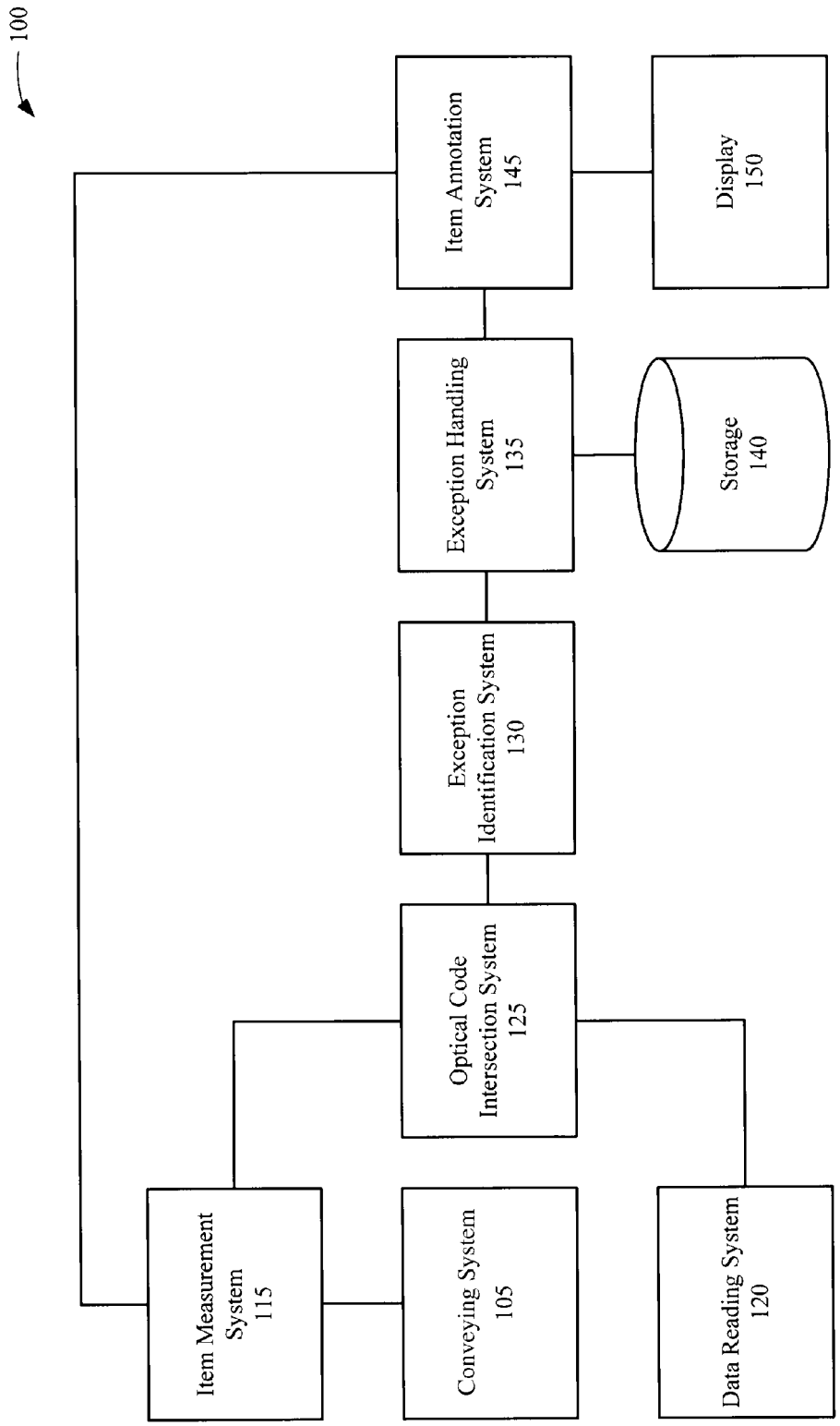
FIG. 2 is a block diagram of an automated data reading system, according to one embodiment.

FIG. 2 is a block diagram of an automated data reading system 100 (or simply, system 100), according to one embodiment. The system 100 and its associated subsystems may include decoders (e.g., software algorithms, hardware constructs) to decode various types of identifying indicia that include different types of optical codes, such as one-dimensional (e.g., linear) codes (e.g., UPC, codabar, code 25, code 39, code 93, code 128, code 11, EAN8, EAN13, plessey, POSTNET), stacked linear codes (e.g., GS1 Databar, PDF417), and two-dimensional (e.g., matrix) codes (e.g., aztec code, maxicode, QR code, high-capacity color barcode, data matrix). In some embodiments, the identifying indicia may include visual recognition features, such as geometric point features or other scale-invariant feature transform (SIFT) features.

To obtain dimensional information from items (see e.g., the items 14 of FIG. 1) that are transported by a conveying system 105, such as conveying system 12, the system 100 includes an item measurement system 115 (see e.g., the optical detectors 58, of FIG. 1). The item measurement system 115 generates volumetric-model or dimensional data that represent items as three-dimensional models. The three-dimensional models are used to track each item as it is transported by the conveying system 105 through a read zone of a data reading system 120.

The data reading system 120 is also operable to generate projection data for optical codes represented in the images it captures. The projection data represent back projection rays that project into the read zone of the data reading system 120. These back projection rays are associated with locations of the representations of the optical codes in the images, and they facilitate association of tracked items with an optical code. For example, the system 100 includes an optical code intersection system 125 that is configured to receive the model data from the item measurement system 115 and the projection data from data reading system 120. The optical code intersection system 125 then uses this received information to determine whether the back projection rays generated for decoded optical codes intersect with the three-dimensional models, for purposes of identifying exceptions.

The system 100 includes an exception identification system 130 that communicates with the optical code intersection system 125. The exception identification system 130 is configured to determine whether optical codes read by the data reading system 120 are associated with three-dimensional models generated by the item measurement system 115. In one example, the exception identification system 130 determines that the optical codes are associated with the three-dimensional models based on intersection determinations made by the optical code intersection system 125. From the associations (or lack of associations) of the optical codes and three-dimensional models, the exception identification system 130 may determine whether exceptions occur. For example, if an item passes through the read zone of the data reading system 120 and the item measurement system 115 generates a three-dimensional model of the item, but no optical code is associated with the three dimensional model (e.g., no back projection ray of an optical code intersects the three-dimensional model), the exception identification system 130 identifies this event as a no-code exception. The exception identification system 130 is also operable to classify and categorize exceptions by types and subtypes and to generate exception category identification information indicative of the exceptions' types and/or subtypes. Additional details of the exception identification system 130 are described in the aforementioned '459 application.

The system 100 includes an exception handling system 135 in communication with the exception identification system 130. The exception handling system 135 determines in what manner to handle or resolve an exception identified by exception identification system 130 based on the exception's type. To this end, the exception category identification information generated by the exception identification system 130 is communicated to the exception handling system 135. The exception handling system 135 is operable to determine that an exception should be resolved in one of multiple ways. For example, the exception handling system 135 may determine that an exception is to be automatically resolved (e.g., ignoring the exception) or manually resolved by an operator (e.g., the customer 2). The exception handling system 135 may communicate with an optional storage device 140 that stores various types of information associated with exceptions, including images of exception items. One embodiment of the exception handling system 135 is described in greater detail below with reference to FIGS. 3-4.

The system 100 may also include an optional exception item annotation system 145 that is operable to generate annotated image data corresponding to visual representations of exceptions to enable a customer to readily identify which items transported through the read zone have associated exceptions. The annotated image data generated by the item annotation system 145 are communicated to a display 150, such as the outlet display 82 (FIG. 1), which displays the visual representations of the exceptions. The item annotation system 145 is described in greater detail in the aforementioned '459 application. Example renderings of annotated image data are shown in FIGS. 5A and 5B, discussed below.

The system 100 and its subsystems may include computing devices, such as processors, and associated software or hardware constructs, and/or memory to carry out certain functions and methods. The computing devices may be embodied in a single central processing unit, or may be distributed such that a system has its own dedicated processor. Moreover, some embodiments of subsystems may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

FIGS. 3-4 are isometric views of the system 4, as viewed from a point of egress of the customer 2. FIG. 3 shows a first imager 180 obtaining first image data 182, or simply, image 182 (see, e.g., image 182 of FIG. 5A) of an item 188 having an associated exception (exception item 188). FIG. 4 shows the second imager 84 obtaining second image data 190, or simply, image 190 (see e.g., image 190 of FIG. 5B) for clearing the associated exception at the exception handing station 80.

As shown in FIG. 3, the first imager 180 is located on the outlet housing section 52 of the data reader 5, and it is positioned to produce a field of view 200 that encompasses items as they exit the read zone 16. As exception items enter the field of view 200, the imager 180 receives a signal to acquire the image 182 (FIG. 5A), which represents the exception item 188 in the read zone 16, or other items that have an associated exception in the read zone 16. The image 182 may also include video data, and it may be presented on the display 82 that is viewable by the customer 2 standing near the exception handling station 80. An image processor 202 included in the system 4 processes the image 182 to extract visual recognition features (e.g., SIFT features) from the image 182, which are used to clear the exception securely and without assistance of an attendant, as described below.

As depicted in FIG. 4, when the exception item 188 reaches the exception handling station 80, the display 82 presents instructions 210 to the customer 2 that instruct the customer 2 to position the exception item 188 within a field of view 212 of the imager 84, and optionally, to position the exception item 188 with its optical code 214 visible to the imager 84. The exception handling station 80 then acquires the image 190 (FIG. 5B) by prompting the customer 2 to manually initiate an image capture. In some embodiments, the image capture may be automatically initiated without initiation by the customer. For example, the image capture may be initiated as part of a continuous image capture sequence, initiated after some delay, or initiated when motion is detected in the field of view 212 for a selected duration. In some embodiments, the image capture of the imager 84 is continuous; the exception handling station 80 continuously searches for SIFT features that match features from the image 182 (FIG. 5A) while also concurrently searching for optical codes in order to passively clear exceptions, as described below.

Once the image 190 is obtained, the image processor 202 (which may be part of the reader 5, or located remotely), or another image processor 220 located in the exception handling station 80, extracts visual recognition features from the image 190. The processor 202 or 220 compares the two sets of features to determine whether the features match and thereby indicate that the same exception item 188 is shown in both the images 182 and 190. In some embodiments, a match of visual recognition features is determined when a sufficient number of visual recognition features in first image data are the same or are similar to visual recognition features in second image data, or are arranged in a similar geometric pattern in two different images. Additional details of extracting and comparing features are described below with respect to FIG. 6. Feature comparison and object recognition are also described in U.S. Pat. No. 8,196,822, titled, "Self Checkout with Visual Recognition," which is hereby fully incorporated by reference. One such known method of object recognition is described in U.S. Pat. No. 6,711,293, titled, "Method and Apparatus for Identifying Scale Invariant Features in an Image and Use of Same for Locating an Object in an Image."

If the exception item 188 does not appear in both the images 182 and 190, the display 82 produces a notification that alerts the customer 2 of the problem, and requests the customer 2 attempt to clear the exception, or optionally informs a checker 230 that assistance is needed. However, if the exception item 188 is determined to be in both the images 182 and 190, the data reader 5 (or a separate decode module, which may be at a point of sale, or performed by the processor 202 or 220) decodes the optical code 214 to identify the exception item 188, thereby clearing the exception and placing the exception item 188 on the transaction list 64.

The exception handling station 80 clears the exception by comparing SIFT features (or other visual recognition features) between the images 182 and 190, verifying the exception item 188 appears in both, and confirming that decoded information (e.g., decoded optical code 214) in the image 190 is associated with the exception item 188 shown in the image 182. In another embodiment, if it is determined the exception item 188 appears in both the images 182 and 190, the visual features from the image 182 or 190 are compared to a visual recognition feature database of known items in order to match the visual features from the images 182 or 190 to the visual features of a known item in the database, thereby identifying the exception item 188 and clearing the exception. Additional details of feature comparison and object recognition are described in U.S. Patent Application Publication No. 2011/0286628, titled, "Systems and Methods for Object Recognition Using a Large Database," which is hereby fully incorporated by reference.

According to one embodiment, decoded information from image 190 is associated with the exception item 188 in the image 182 based on a continuous sequence of image frames showing the exception item 188 traveling from the read zone 16 to the exception handling station 80. The fields of view 200 and 212 may also partly overlap so that matching SIFT features among the sequence may confirm the exception item 188 is continuously present in at least one of the fields of view 200 or 212 while the exception item 188 travels from the read zone 16 to the exception handling station 80. Thus, the matching features in the sequence establish that decoded information from the image 190 is also associated with the exception item 188 shown in the image 182.

In some embodiments, an exception handling station may optionally include a pivoting gate that allows items without exceptions to bypass the exception handling station and arrive unimpeded at the outlet end 10 (e.g., a bagging area). Other embodiments may include an exception handling station that is located along a different transport path, e.g., a path transverse to the path 56, or may include a separate conveying system spaced apart from a bagging area.

As shown in FIGS. 5A and 5B, the exception item 188 may be annotated in the images 182 or 190 with annotated edges 240 that contrast the visual representation of the exception item 188 with the image background and with other superfluous details of the images 182 and 190. Annotated features, such as edges 240, text, arrows, patterns, or other annotations differentiate exception items from other successfully identified items, and when the images 182 or 190 are displayed on the display 82, the customer 2 can readily visually isolate the exception item 188 from other successfully identified items.

FIG. 6 is a flowchart showing a method 300 of automated data reading, according to one embodiment. The steps of the method 300 are presented according to one example order, but the order of the steps in the method 300 may be rearranged when appropriate. Additionally, some of the steps may be performed in parallel (e.g., at the same time), and without intervention of a checker or other attendant. The method 300 includes the following steps.

Step 310 includes transporting or transiting items through a read zone of a data reader configured to acquire identification information of a successfully identified item transported through the read zone. As described above, the items 14 are transported via the conveying system 12 through the read zone 16 of the reader 5. The reader 5 is configured to acquire images of optical codes borne by the items 14, and to decode the optical codes during a successful data read operation.

Step 320 includes identifying an exception for an unidentified item transported through the read zone. For example, the exception identification system 130 identifies exceptions for various situations—including for no-code or phantom-read situations—and the exception is associated with an exception item, such as the exception item 188 (FIGS. 3-4, 5A, and 5B).

Step 330 includes obtaining first image data representing the unidentified item. As noted above, the first image 182 is obtained as the exception item 188 exits the read zone 16; however, the first image 182 may also be acquired from imagers 40 forming the read zone 16 while the items 14 are within the read zone 16 or in any other suitable manner that allows for an exception image to be captured.

Step 340 includes transiting items from the read zone to an exception handling station. In the system 4, for example, the items 14 are transited by the conveying system 12 from the read zone 16 to the exception handling station 80.

At the station 80, step 350 includes obtaining second image data representing the unidentified item. An example of the second image data is the image 190 of FIG. 5B. The image 190 may be obtained automatically as exception items enter the station 80, and may also be obtained in response to the customer 2 manually initiating the exception clearing operation.

Step 360 includes extracting from the first and second image data, corresponding first and second visual recognition features. The first and second visual features are, for example, first and second sets of geometric point features, but other visual recognition features are possible. The features are extracted using the image processor 202, the image processor 220, both, or another suitable computing device configured as a feature extractor. The feature extractor extracts from each of the images 182 and 190, geometric point features that may include one or more of different types of features such as, but not limited to, scale-invariant feature transform (SIFT) features, described in the '293 patent, noted above; speeded up robust features (SURF), described in Herbert Bay et al., "SURF: Speeded Up Robust Features," Computer Vision and Image Understanding (CVIU), Vol. 110, No. 3, pp. 346-359 (2008); gradient location and orientation histogram (GLOH) features, described in Krystian Mikolajczyk & Cordelia Schmid, "A performance evaluation of local descriptors," IEEE Transactions on Pattern Analysis & Machine Intelligence, No. 10, Vol. 27, pp. 1615-1630 (2005); DAISY features, described in Engin Tola et al., "DAISY: An Efficient Dense Descriptor Applied to Wide Baseline Stereo," IEEE Transactions on Pattern Analysis and Machine Intelligence, (2009); and any other types of features that encode the local appearance of the exception item 188 (e.g., features that produce similar results irrespective of how the image of the exception item 188 was captured, irrespective of variations in illumination, scale, position and orientation).

The feature extractor produces for each of the images 182 and 190, feature data representing a feature model of the exception item 188. A feature model corresponds to a collection of features that are derived from the images 182 and 190. Each feature model may include different types of information associated with a feature and with the exception item 188, such as an identifier to identify that the feature is associated with a specific image or item; the X and Y position coordinates, scale, and orientation of the feature; and a multi-dimensional feature descriptor of each feature.

Step 370 includes comparing the first and second visual recognition features to confirm whether the unidentified item is represented in both the first and second image data and to ensure that the unidentified item is the same item that caused an exception. For example, the SIFT algorithm is used to verify that the features in the image 182 match the features from the image 190 presented at the exception handling station 80. With the SIFT algorithm, extracted feature descriptors of one image are compared to the extracted feature descriptors in another image to find nearest neighbors. Two features match when the Euclidian distance between their respective SIFT feature descriptors is below some threshold. These matching features, referred to here as nearest neighbors, may be identified in any number of ways including a linear search (brute force search). In other embodiments, a pattern recognition module identifies a nearest neighbor using a Best-Bin-First search in which the vector components of a feature descriptor are used to search a binary tree composed from each of the feature descriptors of the other images to be searched. Although the Best-Bin-First search is generally less accurate than the linear search, the Best-Bin-First search provides substantially the same results with significant computational savings.

With the features common to the images identified, the image processor determines the geometric consistency between the combinations of matching features. In one embodiment, a combination of features (referred to as feature patterns) is aligned using an affine transformation, which maps the coordinates of features of one image to the coordinates of the corresponding features in another image. If the feature patterns are associated with the same underlying item, the feature descriptors characterizing the item will geometrically align with small difference in the respective feature coordinates. The degree to which feature patterns match (or fail to match) can be quantified in terms of a residual error computed for each affine transform comparison. A small error signifies a close alignment between the feature patterns which may confirm that the same underlying item is being depicted in the two images. In contrast, a large error generally indicates that the feature patterns do not align, although common feature descriptors match individually by coincidence.

The exception may be cleared when there are a sufficient number of matching features between the images 182 and 190, and when information is decoded from the image data so that the exception item 188 is confirmed to have caused the original exception. The exception is cleared by obtaining identifying information, such as an optical code, from the first or second image data, and confirming based on matching SIFT features that the identifying information is associated with the exception item 188 represented in the image 182. Once the exception is cleared, the exception item 188 may be added to the transaction list 64.

The aforementioned embodiments of a data reader are described in a retail setting that should not be considered limiting. Other uses for data readers with the characteristics and features as described may be possible, for example, industrial locations such as a parcel distribution (e.g., postal) station are contemplated and within the scope of this disclosure. Furthermore, though examples are provided primarily with respect to an automated data reader, the systems and methods may be employed in self-checkout systems using manual or semi-automatic data readers. Finally, skilled persons should understand that many changes may be made to the details of the above-described embodiments, without departing from the underlying principles of this disclosure. Thus, the scope of the present invention should be determined only by the following claims.

The invention claimed is:

1. An automated data reading system comprising:
   a data reader defining a read zone and configured to acquire identification information of an item transported through the read zone;
   a processor configured to determine whether the item has been successfully identified;
   a first imager to obtain, in response the item not being successfully identified, first image data representing the item positioned near an outlet of the read zone;
   an exception handling station configured to receive the item, the exception handling station including a second imager to obtain second image data representing the item positioned at the exception handling station;
   an image processor configured to obtain from the first and second image data corresponding first and second visual object recognition features representing a visual property of the item, and further configured to compare the first and second visual object recognition features to determine whether the item appears in both of the first and second image data; and
   a housing encompassing the data reader, the housing including an inlet side and an outlet side, wherein the first imager is located within the housing and positioned to project a field of view into the read zone.

2. An automated data reading system according to claim 1, in which the image processor is further configured to acquire from the second image data, exception-handling identification information of the item, and to identify the item based on the exception-handling identification information.

3. An automated data reading system according to claim 1, in which the identification information is encoded in a barcode.

4. An automated data reading system according to claim 1, in which the identification information comprises scale-invariant feature transform features.

5. An automated data reading system comprising:
   a data reader defining a read zone and configured to acquire identification information of an item transported through the read zone;
   a processor configured to determine whether the item has been successfully identified;
   a first imager to obtain, in response the item not being successfully identified, first image data representing the item positioned near an outlet of the read zone;
   an exception handling station configured to receive the item, the exception handling station including a second imager to obtain second image data representing the item positioned at the exception handling station;
   an image processor configured to obtain from the first and second image data corresponding first and second visual object recognition features representing a visual property of the item, and further configured to compare the first and second visual object recognition features to determine whether the item appears in both of the first and second image data; and
   a housing encompassing the data reader, the housing including an inlet side and an outlet side, wherein the first imager is located above the housing and positioned to project a field of view encompassing a portion of the outlet side.

6. An automated data reading system according to claim 5, in which the first imager comprises an imager of the data reader that is configured to acquire the identification information in response to an initial data-reading operation.

7. An automated data reading system according to claim 5, in which the exception handling station includes a user display configured to present the first image data.

8. An automated data reading system according to claim 7, in which the user display is configured to present user instructions directing a user to obtain the second image data with the second imager.

9. An automated data reading system according to claim 5, in which the first image data comprises video data.

10. An automated data reading system according to claim 5, in which the visual object recognition features comprise scale-invariant feature transform features.

11. An automated data reading system according to claim 5, further comprising a transport path, and in which the exception handling station is located along the transport path.

12. An automated data reading system comprising:
   a data reader defining a read zone and configured to acquire identification information of an item transported through the read zone;
   a processor configured to determine whether the item has been successfully identified;
   a first imager to obtain, in response the item not being successfully identified, first image data representing the item positioned near an outlet of the read zone;
   an exception handling station configured to receive the item, the exception handling station including a second imager to obtain second image data representing the item positioned at the exception handling station;
   an image processor configured to obtain from the first and second image data corresponding first and second visual object recognition features representing a visual property of the item, and further configured to compare the first and second visual object recognition features to determine whether the item appears in both of the first and second image data;
   a conveying system configured to transport items through the read zone;
   an inlet end; and
   an outlet end including the exception handling station, in which the conveying system is operative to transport items from the inlet end, through the read zone, and to the outlet end.

13. An automated data reading system according to claim 12, further comprising:
   an annotation system operable to annotate the first or second image data to indicate an item represented in the first or second image data has not been successfully identified.

14. A method of automated data reading, the method comprising:
   moving items on a conveyor system from an inlet end, through a read zone of a data reader, to an exception processing station at an outlet end;
   obtaining in the read zone first image data representing an unidentified item transported through the read zone;
   obtaining at the exception processing station second image data representing the unidentified item;
   extracting from the first and second image data, corresponding first and second visual object recognition features representing a visual property of the unidentified item; and
   comparing the first and second visual object recognition features to confirm whether the unidentified item is represented in both the first and second image data.

15. A method of automated data reading according to claim 14, further comprising:

identifying, based on the second image data, the unidentified item to establish a subsequently identified item.

16. A method of automated data reading according to claim 15, further comprising:
adding the subsequently identified item to a transaction list.

17. A method of automated data reading according to claim 15, further comprising:
generating an exception in response to the unidentified item being transported through the read zone; and
clearing the exception in response to establishing the subsequently identified item.

18. A method of automated data reading according to claim 14, further comprising:
alerting a user in response to the unidentified item being transported through the read zone by displaying the first image data on a user display located at the exception processing station.

19. A method of automated data reading according to claim 14, in which the second image data includes a representation of an optical code, the method further comprising:
attempting to decode the optical code to identify the unidentified item from the second image data.

20. A method of automated data reading according to claim 19, further comprising:
displaying on a user display located at the exception processing station a notification of whether the optical code was decoded.

21. A method of automated data reading according to claim 14, further comprising:
displaying the second image data on a user display located at the exception processing station.

22. A method of automated data reading according to claim 14, further comprising:
annotating the first image data to generate annotated image data corresponding to visual representations that indicate the unidentified item being transported through the read zone.

* * * * *

UNITED STATES PATENT AND TRADEMARK OFFICE
CERTIFICATE OF CORRECTION

| | | |
|---|---|---|
| PATENT NO. | : 8,919,653 B2 | Page 1 of 1 |
| APPLICATION NO. | : 13/942969 | |
| DATED | : December 30, 2014 | |
| INVENTOR(S) | : Bryan L. Olmstead | |

It is certified that error appears in the above-identified patent and that said Letters Patent is hereby corrected as shown below:

In the Specification

<u>Column 2</u>
Line 63, change "handing" to --handling--.

<u>Column 7</u>
Line 2, change "handing" to --handling--.

<u>Column 8</u>
Line 38, change "handing" to --handling--.

In the Claims

<u>Column 11</u>
Line 8, after "response" insert --to--.
Line 45, after "response" insert --to--.

<u>Column 12</u>
Line 23, after "response" insert --to--.

Signed and Sealed this
Twenty-third Day of February, 2016

Michelle K. Lee
*Director of the United States Patent and Trademark Office*